«12» United States Patent
Pröschel et al.

(10) Patent No.: US 6,506,266 B1
(45) Date of Patent: Jan. 14, 2003

US006506266B1

(54) TIRE OR SOLID WHEEL FOR WHEELSETS OF RAIL VEHICLES

(75) Inventors: Edgar Pröschel, Schwebheim (DE); Heinz Stangner, Dittelbrunn (DE)

(73) Assignee: Fag Oem und Handel AG (DE)

( * ) Notice: Subject to any disclaimer, the term of this patent is extended or adjusted under 35 U.S.C. 154(b) by 0 days.

(21) Appl. No.: 09/493,990

(22) Filed: Jan. 28, 2000

(51) Int. Cl.$^7$ .......................... C22C 38/42; C22C 38/44; B21D 53/26
(52) U.S. Cl. ..................... 148/337; 148/335; 29/894.01
(58) Field of Search .......................... 420/108; 148/335, 148/336, 337, 583; 29/894.01

(56) References Cited

U.S. PATENT DOCUMENTS 3,915,697 A  *  10/1975  Giuliani et al.
4,501,626 A  *   2/1985  Sudo et al.
4,574,016 A  *   3/1986  Yamamoto et al. .......... 148/144
5,310,521 A  *   5/1994  Asseiro et al. ............... 420/109
5,382,307 A  *   1/1995  Kageyama et al. .......... 148/584

FOREIGN PATENT DOCUMENTS

JP         58-045350 A   *  3/1983

* cited by examiner

*Primary Examiner*—George Wyszomierski
*Assistant Examiner*—Harry D. Wilkins, III
(74) *Attorney, Agent, or Firm*—Ostrolenk, Faber, Gerb & Soffen, LLP

(57) ABSTRACT

A composition for steel used for tires or solid wheels of rail vehicles, which composition provides improved properties, in terms of wear, crack susceptibility, ability to withstand thermal loads, homogenous microstructural properties and suitability for high dynamic loads, as compared to standard steels used for tires or solid wheels of rail vehicles. The steel is a modification of AISI S2 steel previously only used for antifriction bearings. The elements of the composition and their presence by percentage of total mass of the steel and ratios of the presence of various elements are disclosed.

4 Claims, No Drawings

TIRE OR SOLID WHEEL FOR WHEELSETS OF RAIL VEHICLES

BACKGROUND OF THE INVENTION

The invention relates to tires or solid wheels for wheel sets of rail vehicles.

In a high-speed wheel-rail system, efforts have been in progress for many years to improve the quality of the tires or solid wheels. In particular, the initial out-of-roundness of new tires and solid wheels, their high level of nonuniform wear, which has further compounded that initial out-of-roundness, as well as the nonhomogeneous microstructural properties of the steel have given rise to much research and attempts at improvement. In this context, reference is made to the Deutsche Bahn AG Technical Report TV9410 A of December 1997, together with the earlier research reports cited therein.

Published documents DE 4,234,192 and EP 0,717,123 have disclosed solutions for selecting an optimized wheel material in the wheel-rail system.

The European draft standard prEN 13262 (June 1998) Rail Applications —Wheelsets and Bogies —Wheels —Product Requirements has specified the steels which are to be used for rail system tires and solid wheels throughout Europe. Despite compliance with this standard, the above problems, such as nonuniform wear, excessive wear, crack susceptibility and nonhomogeneity in the steel microstructure, have not been solved.

SUMMARY AND DETAILED DESCRIPTION OF THE INVENTION

Therefore, an object of the invention is to provide a steel for tires or solid wheels of rail vehicles which provides an improvement in terms of wear, crack susceptibility, ability to withstand thermal loads, homogenous microstructural properties, and suitability for high dynamic loads.

The steel according to the invention is a chemical composition with non-ferrous elements, including a specific combination of elements in a specified percentages by mass and where the elements within that composition are in particular ratios by mass to each other, as specified below.

The invention derives from the surprising discovery that a special antifriction bearing steel (AISI S2), which previously has only been used in a marginal area of antifriction bearing technology and, specifically, only used for antifriction bearings for drilling heads used in deep well drilling for the extraction of natural gas and crude oil, has significantly better material properties for use in a tire or solid wheel of a rail vehicle than the standard steels now used there, particularly, with modifications in the composition to ensure through-hardening and homogeneity.

AISI S2 steel has in fact been so highly developed that the modified composition exhibits the same material properties when used in thicker-walled tires and wheels that it exhibits when used in the thinner-walled bearings.

The steel according to the invention has a high wear resistance and a high resistance to heat. Both those values are significantly above those of steels which have been in use. In this connection, the elements Si and Mn have a significant effect. The ratio of Si/Mn should be 1.8 to 2.2. In the steels described in the above-mentioned documents and the European standard, this ratio is reversed. Consequently, the above-mentioned advantages are not achieved.

The novel steel also has a high mechanical load-bearing capacity. The individual properties attain the following values:

Yield strength ratio $R_{p0.2}/R_m > 0.7$,

Yield strength $R_{p0.2} = 750 \ldots 800 \text{N/mm}^2$,

Tensile strength $R_m = 900 \ldots 1050 \text{N/mm}^2$,

Elongation $(A_5) > 15\%$,

Notched-impact energy>50 Joules (DVM [German Materials Research and Testing Association] specimen).

These excellent properties are achieved by inclusion in the steel of the elements C, Si, Mn, Mo and V, which must be present in the precisely defined ratio, and by inclusion of small quantities by mass of the elements P and S.

To achieve a uniform microstructure and good, even, full hardening over the periphery and the cross section, the elements V, Mo, Cr and Mn should be present within the tight range limits stated. The ratio by weight of these four elements is:

V:Mo:Cr:Mn=1:2.2 to 3.2:3.2 to 3.8:4.2 to 4.8.

A preferred combination for the steel according to the invention is:

Si/Mn=2;

V:Mo:Cr:Mn=1:2.7:3.4:4.5

This results in a preferred chemical composition by mass of:

C=0.5%; Si=1.3%; Mn=0.7%; P<0.01%; S<0.01%; Cr=0.5%; Cu=0.15%; Mo=0.4%; Ni=0.2%; V=0.15%, with the remainder Fe.

The steel according to the invention was subjected to thorough, fundamental tests, which confirmed its clear superiority to the standardized steel used for tires and solids wheels.

Compared to the standard steels, when the steel according to the invention is used in new tires or solid wheels, the steel permits considerably higher permissible surface pressures (by a factor of 1.6), a higher yield strength, an improved resistance to heat and a higher wear resistance (by a factor of 5) combined with improved toughness properties, uniform wear and more homogenous microstructural properties.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rail vehicle wheel made of a steel composition, comprising:

more than 0.45 to about 0.55 weight % carbon;

1.2 to 1.3 weight % silicon;

0.6 to 0.7 weight % manganese;

less than 0.01 weight % phosphorous;

less than 0.01 weight % sulphur;

less than 0.5 weight % chromium;

less than or equal to 0.15 weight % copper;

0.4 to 0.5 weight % molybdenum;

less than or equal to 0.2 weight % nickel;

0.11 to 0.16 weight % vanadium; and the remainder of the weight % iron;

wherein the ratio of silicon/manganese is 1.8 to 2.2; and wherein:

the ratio of vanadium: molybdenum: chromium: manganese is 1:2.2 to 3.2:3.2 to 3.8:4.2 to 4.8.

2. A wheel as claimed in claim 1, comprising 0.5 weight % carbon; 1.3 weight % silicon; 0.7 weight % manganese; less than 0.01 weight % phosphorous; less than 0.01 weight % sulphur; 0.5 weight % chromium; 0.15 weight % copper; 0.4 weight % molybdenum; 0.2 weight % nickel; 0.15 weight % vanadium; and the remainder of the weight % iron.

3. A method of making a wheel for a rail vehicle, comprising the steps of:

forming a steel composition comprising more than 0.45 to 0.55 weight % carbon; 1.2 to 1.3 weight % silicon; 0.6 to 0.7 weight % manganese; less than 0.01 weight % phosphorous; less than 0.01 weight % sulphur; less than 0.5 weight % chromium; less than 0.15 weight % copper; 0.4 to 0.5 weight % molybdenum; less than 0.2 weight % nickel; 0.11 to 0.16 weight % vanadium; and the remainder of the weight % iron; and forming said steel composition into a tire or wheel for a rail vehicle, wherein the ratio of silicon/manganese is 1.8 to 2.2; and wherein the ratio of vanadium: molybdenum: chromium: manganese is 1:2.2 to 3.2:3.2 to 3.8 4.2 to 4.8.

4. A method of making a wheel for a rail vehicle as claimed in claim 3, wherein said steel composition comprises 0.5 weight % carbon; 1.3 weight % silicon; 0.7 weight % manganese; less than 0.01 weight % phosphorous; less than 0.01 weight % sulphur; 0.5 weight % chromium; 0.15 weight % copper; 0.4 weight % molybdenum; 0.2 weight % nickel; 0.15 weight % vanadium; and the remainder of the weight % iron.

* * * * *